United States Patent [19]

Yamazaki et al.

[11] Patent Number: 5,013,116

[45] Date of Patent: May 7, 1991

[54] POLARIZATION CONTROL OF BIDIRECTIONALLY TRANSMITTED BEAMS BY A SINGLE POLARIZATION CONTROLLER

[75] Inventors: Shuntaro Yamazaki; Takashi Ono, both of Tokyo, Japan

[73] Assignee: NEC Corporation, Tokyo, Japan

[21] Appl. No.: 527,470

[22] Filed: May 23, 1990

[30] Foreign Application Priority Data

May 23, 1989 [JP] Japan .................................. 1-130510
May 23, 1989 [JP] Japan .................................. 1-130511

[51] Int. Cl.$^5$ ........................... G02B 6/26; G02B 6/42
[52] U.S. Cl. ................................ 350/96.15; 350/96.16
[58] Field of Search ................... 350/96.15, 96.16, 407; 455/612, 618, 619

[56] References Cited

U.S. PATENT DOCUMENTS 4,932,739  6/1990  Islam ................................. 350/96.16
4,971,417 11/1990  Krinsky et al. ................... 350/96.16

*Primary Examiner*—William L. Sikes
*Assistant Examiner*—Robert E. Wise
*Attorney, Agent, or Firm*—Sughrue, Mion, Zinn, Macpeak & Seas

[57] ABSTRACT

In an optical communication system where first and second transmitter devices (12, 16) bidirectionally transmit first and second signal beams through an optical fiber (11) and first and second receiver devices (13, 17) receive the second and the first signal beams, respectively, a polarization control system comprises a polarization control unit (21) between the optical fiber and the first transmitter and receiver devices and a controller (23) for controlling the polarization control unit by a detected signal produced by the first receiver device so as to supply the second signal beam to the first receiver device with a constant reference polarization state. The first signal beam may be an FDM signal beam. In this event, the second receiver device comprises tunable receivers (R×1/100) which may be installed in a hub together with the second transmitter device and connected to terminal units through metal cables. Preferably, the first transmitter device generates the first signal beam with a polarization state adjusted either parallel or orthogonal to the reference polarization state. More preferably, the first and the second signal beams should have frequencies determined in consideration of polarization dispersion.

19 Claims, 4 Drawing Sheets

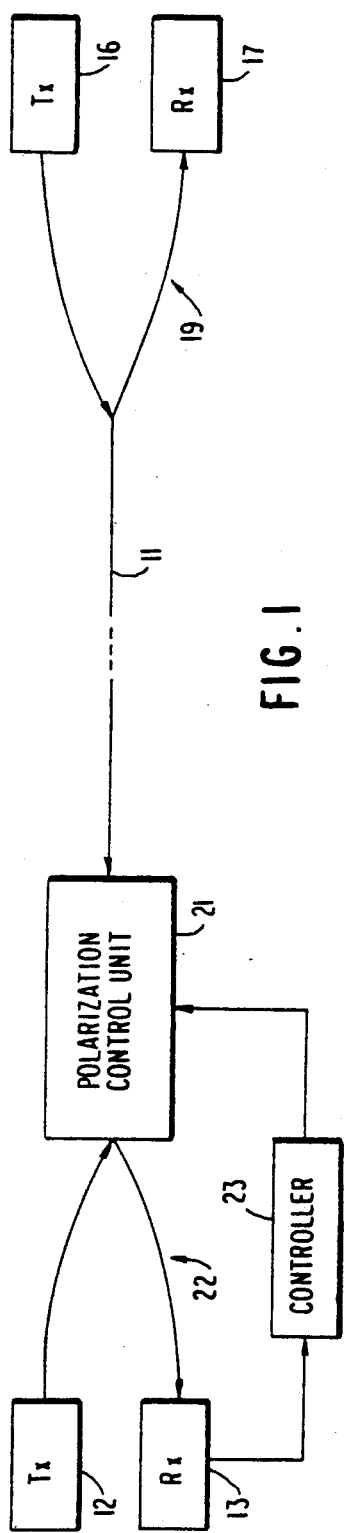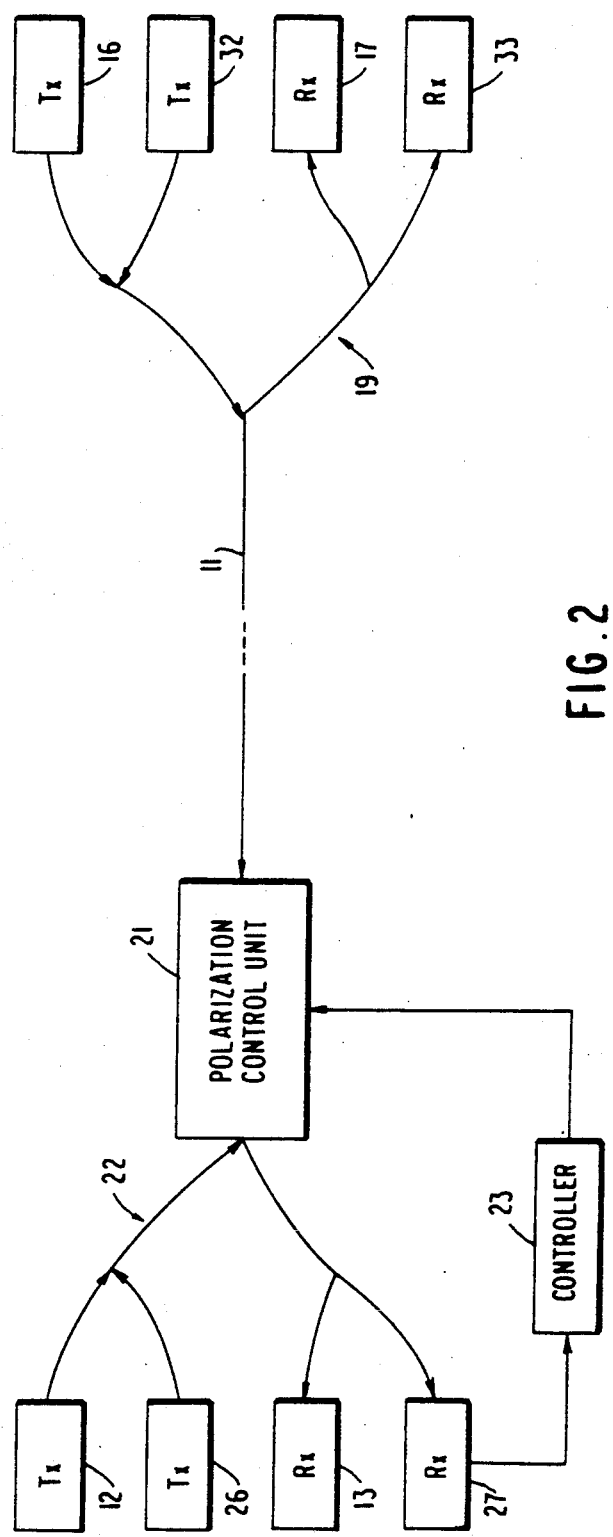

POLARIZATION CONTROL OF BIDIRECTIONALLY TRANSMITTED BEAMS BY A SINGLE POLARIZATION CONTROLLER

BACKGROUND OF THE INVENTION

This invention relates to a polarization control system for use in an optical communication system which is typically either a bidirectional coherent optical communication system or a frequency division multiplexed (FDM) optical signal distributing system.

Having diligently continued reduction to practice of this invention after filing in Japan, the present applicants contributed, together with two others, a letter to the IEEE Photonics Technology Letters. The letter was printed in Volume 2, No. 2 (Feb. 1990), pages 135 to 138, under the title of "A Bidirectional Common Polarization Control Method for Coherent Optical FDM Transmission System". The printed letter is herein incorporated by reference.

In general, an optical communication system comprises an optical fiber having first and second ends. The optical fiber is, for example, from 20 km to 100 km long and has a birefringence which is inevitably subjected at various parts of the length to variations by the ambient temperature of the optical fiber, external pressure supplied to the optical fiber, or both. It is therefore unavoidable that a signal beam has a polarization state which undergoes fluctuations while transmitted through the optical fiber.

In the optical communication system, a first or first-end transmitter device and a first or first-end receiver device are connected to the first end. A second or second-end transmitter device and a second or second-end receiver device are connected to the second end. The first transmitter device is for generating a first signal beam which is transmitted through the optical fiber from the first end to the second end to be received by the second receiver device. The second transmitter device generates a second signal beam for transmission through the optical fiber from the second end to the first end and for reception by the first receiver device. Due to the fluctuations in the polarization state, each receiver device can not always have a best reception sensitivity.

It is possible to avoid occurrence of the fluctuations and to always achieve the best receiver sensitivity if the optical fiber is of a polarization maintaining type. A polarization maintaining optical fiber is, however, very expensive. It is therefore usual to use a single-mode optical fiber and a polarization control system in order to suppress the fluctuations.

The polarization control system may be operable according either to automatic polarization control or to polarization diversity. When the polarization diversity is resorted to, each receiver device must have a complicated structure. Moreover, the reception sensitivity becomes poor. It is therefore preferred to use the automatic polarization control for simplification of each receiver device and for achievement of a high reception sensitivity.

In a conventional polarization control system, first and second polarization control devices are used near the first and the second ends to suppress the fluctuations in the polarization state of the second signal beam arriving at the first receiver device and the fluctuations in the polarization state of the first signal beam reaching the second receiver device. This undesiredly raises the price of the polarization control system and consequently the price of the optical communication system.

SUMMARY OF THE INVENTION

It is therefore an object of the present invention to provide a polarization control system which is simple in structure and is not expensive.

Other objects of this invention will become clear as the description proceeds.

On describing the gist of this invention, it is possible to understand that a polarization control system is for use in an optical communication system which comprises an optical fiber having first and second ends, first and second transmitter devices for delivering first and second signal beams to the first and the second ends, respectively, and first and second receiver devices for receiving the second and the first signal beams from the first and the second ends, respectively. The first receiver device thereby produces a detected signal. The above-understood polarization control system comprises, according to this invention, a polarization control unit having a fiber end connected to the first end and a device end connected to the first transmitter device and to the first receiver device, and a controller supplied with the detected signal for controlling the polarization control unit so as to make the polarization control unit supply the second signal beam to the first receiver device with a polarization state which is kept substantially constant.

BRIEF DESCRIPTION OF THE DRAWING

FIG. 1 is a block diagram of a bidirectional coherent optical communication system comprising a polarization control system according to a first embodiment of the instant invention;

FIG. 2 is a block diagram of another bidirectional coherent optical communication system comprising a polarization control system according to a second embodiment of this invention;

DESCRIPTION OF THE PREFERRED EMBODIMENTS

Figure 3:
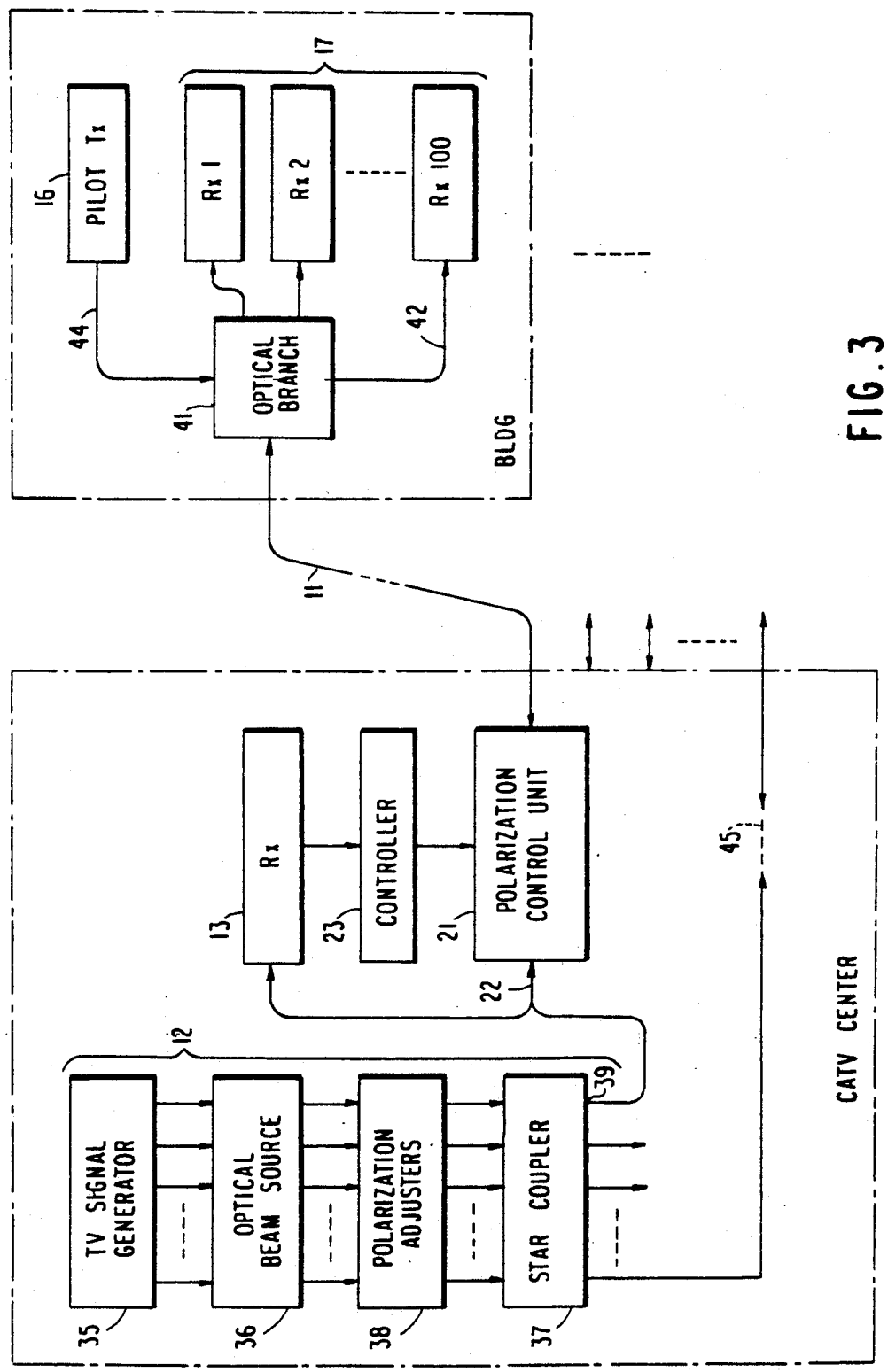
FIG. 3 is a block diagram of a frequency division multiplexed optical signal distributing system comprising a polarization control system according to a third embodiment of this invention.

Referring to FIG. 1, a bidirectional coherent optical communication system comprises a polarization control system according to a first embodiment of the present invention. The optical communication system is for bidirectionally transmitting two optical signal beams, each of which is a single signal beam.

The optical communication system comprises an optical fiber 11 having first or left and second or right ends. The optical fiber 11 is a single-mode optical fiber and is typically 100 km long.

A first or first-end transmitter 12 and a first or first-end receiver 13 are connected to the first end in the manner which will presently become clear. A second or second-end transmitter 16 and a second or second-end receiver 17 are connected to the second end through local optical fibers 19 in the manner known in the art. More particularly, the local optical fibers 19 serve either as an optical coupler or an optical branching circuit. Preferably, the local optical fibers 19 are polarization maintaining optical fibers which are fused together with their principal axes matched.

The first transmitter 12 is for generating a first signal beam which is transmitted through the optical fiber 11 from the first end to the second end and is received by the second receiver 17. The second transmitter 16 generates a second signal beam for transmission through the optical fiber 11 from the second end to the first end and for reception by the first receiver 13. The first and the second transmitters 12 and 16 are therefore for delivering the first and the second signal beams to the first and the second ends, respectively. The first and the second receivers 13 and 17 are for receiving the second and the first signal beams from the first and the second ends, respectively.

It will be assumed that each of the first and the second signal beams has a frequency of 200 THz. At each of the first and the second transmitters 12 and 16, the signal beam is generated by carrying out binary frequency shift keying (FSK) modulation at a bit rate of 1.2 Gb/s.

In the manner which will later be illustrated, each of the first and the second receivers 13 and 17 comprises a local beam source for generating a local oscillation beam, an optical detector or photodetector supplied with a pertinent one of the first and the second signal beams and with the local oscillation beam to produce an intermediate frequency (IF) signal, and a demodulator for demodulating the intermediate frequency signal into a baseband signal. A combination of the local beam source and the optical detector will be referred to as an optical detector unit. Merely for convenience of the description, the intermediate frequency signal is herein called a detected signal, which has a certain electric power level.

While transmitted through the optical fiber 11, each of the first and the second signal beams undergoes fluctuations in its polarization state. In other words, each signal beam becomes to have a plane or direction of polarization which is subjected to the fluctuations. Due to the fluctuations in the polarization state or in the plane of polarization, each of the first and the second receivers 13 and 17 can not always have a best reception sensitivity. Incidentally, the power level of each detected signal varies with the fluctuations.

The polarization control system is used to suppress the fluctuations and comprises a single polarization control unit 21 having two ends. One of the two ends is herein called a fiber end because it is connected to the optical fiber 11 at one of the first and the second ends. The other end is called a device end because it is connected to the transmitter 12 or 16 and to the receiver 13 or 17. In the manner which will shortly be exemplified, the polarization control unit 21 comprises an optical fiber which may be called a control fiber. The fiber and the device ends of the polarization control unit 21 are two ends of the control fiber.

It will be presumed without loss of generality that the fiber end of the polarization control unit 21 is connected to the first end of the optical fiber 11. The device end is consequently connected to the first transmitter 12 and to the first receiver 13 through polarization maintaining optical fibers which are collectively indicated at 22. The polarization maintaining optical fibers 22 are fused together with their characteristic axes matched to provide either an optical coupler or an optical branching circuit.

A controller 23 is supplied with the detected signal from the first receiver 13. Detecting the power level of the detected signal, the controller 23 controls the polarization control unit 21 so as to keep the power level maximum. In practice, the detected signal is readily made to represent the power level. In this event, the controller 23 is implemented by a microprocessor.

When the power level is maximized, the polarization control unit 21 produces the second signal beam from the device end with the plane of polarization of the second signal beam controlled to be coincident with the characteristic axis of the polarization maintaining optical fibers 22. In other words, the polarization state of the second signal beam is kept constant at the device end. The controller 23 can therefore be said to control the polarization control unit 21 so as to make the polarization control unit 21 supply the second signal beam to the first receiver 13 with its polarization state kept constant.

In this manner, the first receiver 13 receives the second signal beam with a stabilized state or plane of polarization. This state of polarization will be called a reference polarization state. Needless to say that the local beam source should be polarization adjusted to generate the local oscillation beam with the reference polarization state.

Various polarization control units are already known in the art. For example, the polarization control unit 21 comprises the above-mentioned control fiber and several piezoelectric actuators (not shown) which are arranged between the fiber and the device ends and are supplied with the detected signal to squeeze the control fiber in response to the power level. If necessary, its details should be understood from an article contributed by Reinhold Noé and two others to the Journal of Lightwave Technology, Volume 6, No. 7 (July 1988), pages 1199 to 1208, under the title of "Endless Polarization Control System for Coherent Optics".

Generally speaking, the first transmitter 12 generates the first signal beam with a certain state of polarization. The polarization maintaining optical fibers 22, however, have the characteristic axis. The first transmitter 12 is therefore polarization adjusted in the known manner to make the first signal beam have a controlled polarization state which should be either parallel or orthogonal to the reference polarization state.

When the first signal beam is supplied to the device end of the polarization control unit 21 with the controlled polarization state, the polarization control unit 21 supplies the first signal beam from the fiber end to the first end of the optical fiber 11 with a polarization state subjected to fluctuations which are identical with the fluctuations suppressed by the polarization control unit 21 as regards the second signal beam. Inasmuch as the optical fiber 11 is used in common by the first and the second signal beams, the first signal beam reaches the second receiver 17 with its polarization state kept constant.

It is now understood that a combination of the optical fiber 11 and the polarization control unit 21 serves as a polarization maintaining optical fiber. Inasmuch as the single polarization control unit 21 is used together with only one controller 23, the polarization control system is simple in structure and is not expensive.

It should be noted in connection with the above that a plurality of signal beams of different frequencies are subjected to polarization dispersion while transmitted through the optical fiber 11. It may be mentioned here that the fluctuations are caused in the polarization states of the first and the second signal beams by variations introduced into the birefringence of the optical fiber 11 by its ambient temperature, external pressure supplied to the optical fiber 11, or both. Resulting from the variations in the birefringence, the fluctuations depend on the frequencies or wavelengths. This gives rise to the polarization dispersion.

When the first and the second signal beams have widely different frequencies, the single polarization control unit 21 can not cope with the polarization dispersion. It is therefore desirable that the first and the second signal beams should have a substantially common frequency.

It should furthermore be noted that the second signal beam may be subjected to near-end crosstalk with the first signal beam. This adversely affects the receiver sensitivity of the second receiver 17 for the first signal beam. The near-end crosstalk also appears to adversely affect the reception sensitivity of the first receiver 13 for the second signal beam. The first and the second signal beams should therefore have different frequencies particularly when the polarization dispersion is little. Preferably, the different frequencies should have a frequency separation which is equal to about six times the bit rate of the frequency shift keying modulation.

The first transmitter 12 may be called a first transmitter device particularly when attention is directed to a combination of the first transmitter 12 and one of the polarization maintaining optical fibers 22 that connects the first transmitter 12 to the device end of the polarization control unit 21. Similarly, the first receiver 13 may alternatively be called a first receiver device. The second transmitter 16 may be called a second transmitter device particularly when attention is directed to a combination of the second transmitter 16 and one of the local optical fibers 19 that is between the second transmitter 16 and the second end of the optical fiber 11. Likewise, the second receiver 17 may alternatively be called a second receiver device. The first end is a point of connection of the optical fiber 11 to the polarization control unit 21. The second end is a point of connection between the optical fiber 11 and the local optical fibers 19.

Turning to FIG. 2, another bidirectional coherent optical communication system comprises a polarization control system according to a second embodiment of this invention. Depicted in FIG. 2, the optical communication system is for bidirectionally transmitting two optical signal beams, each of which is a two-channel frequency division multiplexed (FDM) or wavelength division multiplexed (WDM) signal beams.

The optical communication and the polarization control systems comprise similar parts which are designated by like reference numerals and are operable with likewise named signals and signal beams. In addition to the first transmitter 12 and the first receiver 13, a third transmitter 26 and a third receiver 27 are connected through branches of the polarization maintaining optical fibers 22 to the device end of the polarization control unit 21 of the polarization control system. A fourth transmitter 32 and a fourth receiver 33 are connected together with the second transmitter 16 and the second receiver 17 through branches of the local optical fibers 19 to the second end of the optical fiber 11, which may be again 100 km long.

In the example being illustrated, each of the first through the fourth transmitters 12, 16, 26, and 32 generates a single signal beam. The signal beams are produced by the first and the second transmitters 12 and 16 at a frequency of 200.0 THz as 200.0-THz signal beams. The signal beams are produced by the third and the fourth transmitters 26 and 32 at another frequency of 200.2 THz as 200.2-THz signal beams.

Generated by the first and the third transmitters 12 and 26, the signal beams are frequency division multiplexed at a junction or point of branches of the polarization maintaining optical fibers 22 into a frequency division multiplexed signal beam for delivery to the first end of the optical fiber 11 through the polarization control unit 21. This signal beam corresponds to the first signal beam. Generated by the second and the fourth transmitters 16 and 32, the signal beams are frequency division multiplexed at a junction of branches of the local optical fiber 19 into another frequency division multiplexed signal beam for supply to the second end of the optical fiber 11. This latter signal beam serves as the second signal beam.

A combination of the first and the third transmitters 12 and 26 therefore corresponds to the first transmitter device. Another combination of the second and the fourth transmitters 16 and 32 likewise serves as the second transmitter device. The first and the second signal beams are in a substantially common frequency band.

Transmitted through the optical fiber 11 to the second end and through the local optical fibers 19, the first signal beam is received by the second receiver 17 which comprises the local beam source for the 200.0-THz signal beam in the manner described hereinabove. The first signal beam is received also by the fourth receiver 33 comprising a local beam source for the 200.2-THz signal beam. Transmitted through the optical fiber 11 to the first end and through the polarization control unit 21 and the polarization maintaining optical fibers 22, the second signal beam is received by the first and the third receivers 13 and 27 which comprise local beam sources for the 200.0-THz and the 200.2-THz signal beams, respectively.

A combination of the first and the third receivers 13 and 27 therefore corresponds to the first receiver device. Another combination of the second and the fourth receivers 17 and 33 serves as the second receiver device. For the polarization control unit 21, the controller 23 is supplied with the detected signal produced by a predetermined one of the receivers 13 and 27 of the first receiver device. Inasmuch as the predetermined one of such receivers is included in the first receiver device, it is possible to understand that the detected signal is produced by the first receiver device.

Referring now to FIG. 3, a frequency division multiplexed optical signal distributing system comprises a polarization control system according to a third embodiment of this invention. The optical signal distributing system is an optical communication system for distributing a frequency division multiplexed optical signal beam to a great number of subscriber terminals which will presently become clear. In a conventional optical communication system of the type described, a polarization control unit is installed in each subscriber's terminal. The polarization control and the optical communication systems have therefore been very expensive. Moreover, the polarization control and the optical communication systes have had an insufficient reliability.

In the example being illustrated, the optical communication system comprises a community antenna television (CATV) center for sending a frequency division multiplexed signal beam to the subscriber terminals through a plurality of single-mode optical fibers. The center comprises a transmission signal generator 35 for generating twenty-channel high definition television signals at a bit rate of 100 Mb/s. An optical beam source 36 generates twenty-channel optical carrier signals with a 5-GHz interval in a frequency band between 200.00 THz and 200.10 THz. In the optical beam source 36, the optical carrier signals are modulated by the respective television signals into twenty-channel modulated optical signals according to the frequency shift keying modulation at the bit rate of 100 Mb/s. A star coupler 37 frequency or wavelength division multiplexes the modulated optical signals into the frequency division multiplexed signal beam and branches the frequency division multiplexed signal beam to a plurality of output ports thereof. Merely for convenience of the description which follows, a syntagm "a transmitter unit" will be used to represent a combination of the signal generator 35, the beam source 36, the star coupler 37, and a block 38 which will later be described.

It will be surmised that the subscriber terminals are 1,600 in number and are for use by subscribers who are living in sixteen apartment-house buildings. Sixteen single-mode optical fibers are therefore extended from the community antenna television center to the respective buildings. In the manner which will later become clear, a combination of the subscriber terminals in each building serves as a receiver device thus far described.

As far as possible, similar parts of the optical communication and the polarization control systems will be designated by like reference numerals. In correspondence to the sixteen single-mode optical fibers, the output ports of the star coupler 37 are sixteen in number. One of the output ports is depicted as a representative output port 39 and is connected to the device end of the polarization control unit 21 through a branch of the polarization maintaining optical fibers 22. In the manner which will become clear as the description proceeds, the device end is connected furthermore to the first receiver 13 which is of the type so far described and delivers the detected signal to the controller 23 for use in controlling the polarization control unit 21.

The fiber end of the polarization control unit 21 is connected to the first end of one of the single-mode optical fibers that is indicated at 11. The optical fiber 11 has a length of about 20 km and has the second end connected to one of sixteen receiver devices that corresponds to the representative output port 39 and is depicted as a corresponding receiver device 17. It is now understood that a combination of the transmitter unit and the representative output port 39 serves as the first transmitter device and that the frequency division multiplexed signal beam corresponds to the first signal beam. The first receiver 13 serves as the first receiver device. The corresponding receiver device 17 serves as the second receiver device.

It will be assumed without loss of generality that one hundred tunable receivers Rx1 through Rx100 are installed in each building. In the corresponding receiver device 17, the second end of the optical fiber 11 is connected to an optical branching circuit 41 for use in branching the frequency division multiplexed signal beam to the receivers Rx1 through Rx100 through one hundred polarization maintaining optical fibers which are collectively indicated at 42. Each of the receivers Rx1 to Rx100 carries out tunable optical heterodyne detection of the frequency division multiplexed signal beam. The optical branching circuit 41 is at least one point of junction at which the polarization maintaining optical fibers 42 are fused to one another with their characteristic axes matched. A combination of the optical branching circuit 41 and the polarization maintaining optical fibers 42 therefore serves as the local optical fibers 19 described in conjunction with FIGS. 1 and 2.

In the building where the corresponding receiver device 17 is installed, a pilot signal transmitter generates a pilot signal beam of 200.05 THz for delivery to the second end of the optical fiber 11 through a polarization maintaining optical fiber 44 and through the optical branching circuit 41 which now serves as an optical coupler. In the manner which will presently become clear, the pilot signal beam is used as the second signal beam thus far described. The pilot signal transmitter therefore serves as the second transmitter device and is indicated at 16.

Transmitted through the optical fiber 11 from the second end to the first end, the pilot signal beam is used in the community antenna television center in making the first receiver 13 produce the detected signal and in making the controller 23 control the polarization control unit 21 in response to the detected signal so as to maximize the power level of the detected signal. The pilot signal beam is thereby given the reference polarization state at the device end of the polarization control unit 21.

The polarization control system therefore comprises in connection with the optical fiber 11 the pilot signal transmitter 16 for delivering the pilot signal beam to the second end of the optical fiber 11. As before, the polarization control unit 21 has the fiber end connected to the first end of the optical fiber 11 and the device end connected to the above-mentioned one of the output ports of the transmitter unit that is named the representative output port 39. The first receiver 13 may alternatively be called a pilot signal receiver and is connected to the device end to detect the pilot signal beam transmitted through the optical fiber 11 and the polarization control unit 21 and to produce the detected signal. The controller 23 is used in the manner described heretobefore.

The optical communication system comprises such a polarization control system in connection with each of the sixteen optical fibers. In the community antenna television center, a dashed-line part 45 represents a set of a pilot signal receiver, a polarization control unit, polarization maintaining optical fibers, and a controller which correspond to those depicted at 13 and 21 through 23 for the optical fiber 11. Pilot signals are received from the respective buildings and are made to have the reference polarization states which are matched to one another at the device ends of the respective polarization control units, such as 21, and may be called a common reference polarization state.

In the community antenna television center, the above-mentioned block 38 represent twenty polarization adjusters for making the modulated optical signals be delivered from the respective output ports with their respective controlled polarization states which are in the above-described predetermined relationship with the common reference polarization state at the device ends of the respective polarization control units. In other words, the frequency division multiplexed signal beam is produced from each of the output ports with the controlled polarization state. The polarization adjusters 38 may be manually or otherwise adjusted.

Like in FIGS. 1 and 2, each polarization control system is capable of suppressing the fluctuations in the polarization state of the pilot signal beam at the device end of the polarization control unit and the fluctuations of the polarization state of the frequency division multiplexed signal beam at the second end of the optical fiber. Furthermore, the polarization control units, the pilot signal receivers, and the controllers, such as 21, 13, and 23, of the respective polarization control systems are installed in the community antenna television center in connection with the respective optical fibers, such as 11, and can excellently be maintained and administered. The polarization control systems are therefore highly reliable. This gives a high reliability to the optical communication system.

Reviewing FIG. 3, the frequency division multiplexed signal beam and each pilot signal beam are bidirectionally transmitted through one of the single-mode optical fibers. It is therefore possible to understand that each polarization control system is included in the optical signal distributing system which is operable as a bidirectional coherent optical communication system of a sort.

More particularly, attention will be directed to one of the optical fibers of the optical communication system that is depicted at 11. The above-mentioned transmitter unit 35/38 has the output ports and is for making each of the output ports produce the first signal beam. It is therefore possible to understand that the first transmitter device is composed of the transmitter unit and one of the output ports that is named the representative output port 39. The second receiver device 17 is in correspondence to the representative output port 39 and comprises the tunable receivers Rx1 through Rx100 for tunably receiving the first signal beam from the second end of the optical fiber 11.

Figure 4:
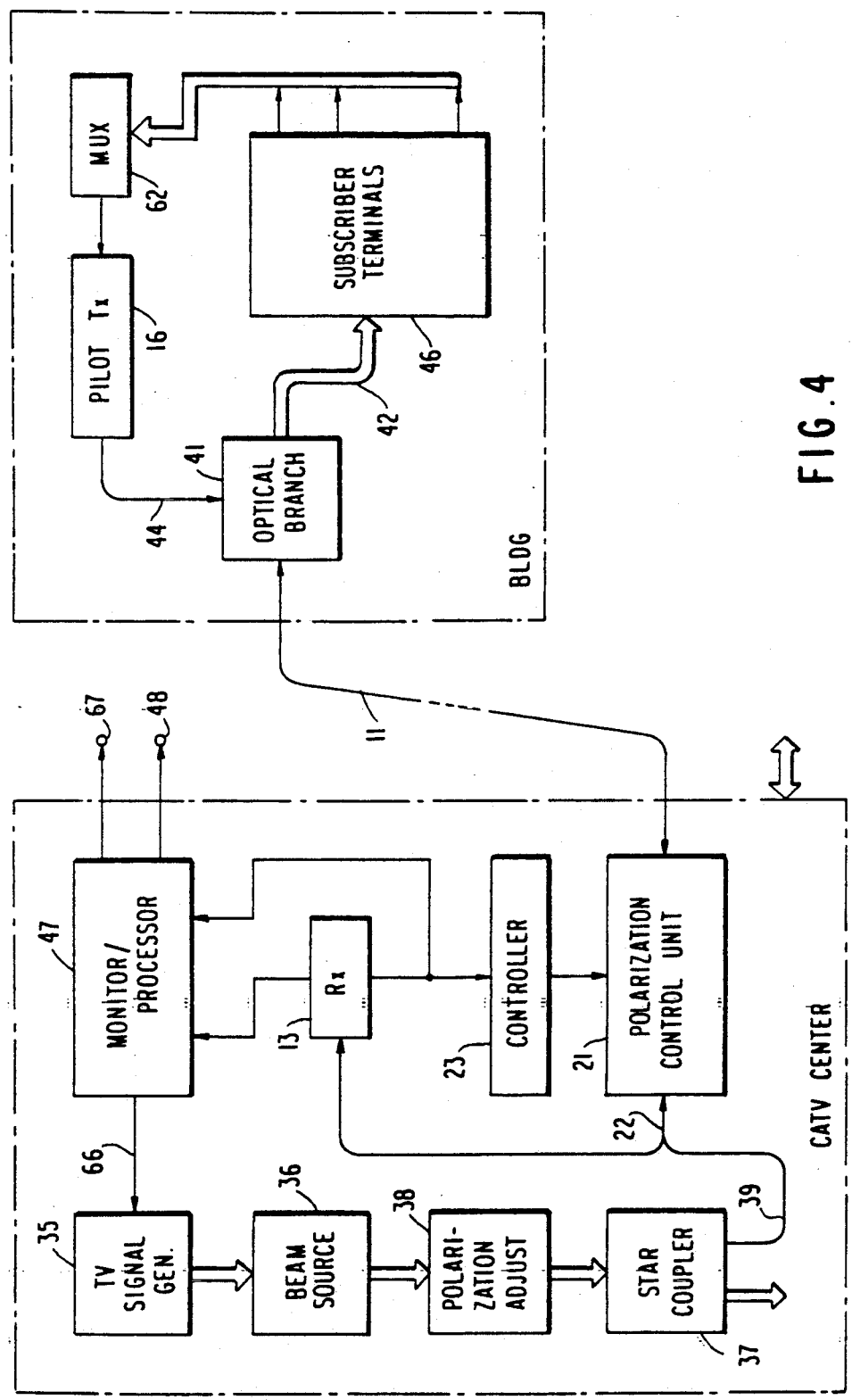
FIG. 4 is a block diagram of another frequency division multiplexed optical signal distributing system which comprises a polarization control system according to a fourth embodiment of this invention.

Referring to FIG. 4, another frequency division multiplexed optical signal distributing system comprises a polarization control system according to a fourth embodiment of this invention. Similar parts of the optical communication and the polarization control systems are designated by like reference numerals and are operable with likewise named signals and signal beams.

In the apartment-house building, the subscriber terminals are collectively depicted at 46. In the community antenna television center, a monitoring and processing unit 47 is connected to the pilot signal receivers, such as 13, of the polarization control systems used in connection with the respective optical fibers, such as 11. Each detected signal and each power level may be alternatively called a detector output and an output level. Monitoring the output levels, the monitoring and processing unit 47 serves as a monitoring unit for delivering an alarm signal to an alarm terminal 48. An undue decrease in at least one of the output levels indicates occurrence of a fault in at least one of the polarization control and the optical communication systems. The alarm signal informs an attendant to the center of occurrence of the fault.

Figure 5:
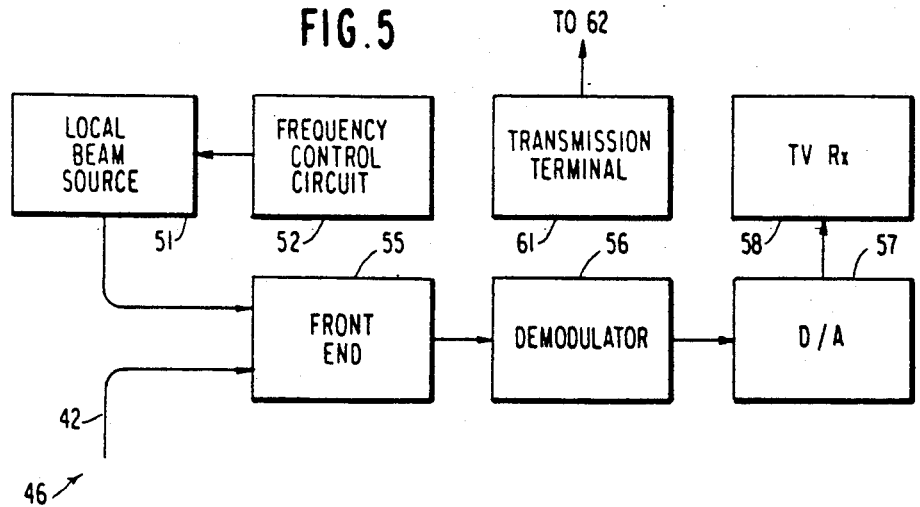
FIG. 5 is a block diagram of a subscriber's terminal for use in the optical signal distributing system illustrated in FIG. 4.

Turning to FIG. 5 during a short while, one of the subscriber terminals 46 is for use by each subscriber and comprises a tunable receiver which is one of the tunable receivers Rx1 through Rx100 depicted in FIG. 4 and is supplied with the frequency division multiplexed signal beam through one of the polarization maintaining optical fibers 42. In the receiver, a local beam source 51 tunably generates a local oscillation beam for use in optical heterodyne detection of the frequency division multiplexed signal beam. The local beam source 51 is tuned by a frequency control circuit 52 which is manually controlled.

In the tunable receiver, a front end 55 is supplied with the frequency division multiplexed signal beam through the above-mentioned one of the polarization maintaining optical fibers 42 and with the local oscillation beam from the local beam source 51. Although not individually depicted, a beam coupler and an avalanche photodiode are used in the front end 55. The beam coupler is for coupling the frequency division multiplexed signal beam and the local oscillation beam together into a coupled beam. Serving as the optical detector, the avalanche photodiode produces an intermediate frequency signal.

A demodulator 56 demodulates the intermediate frequency signal into a baseband digital signal. A digital-to-analog (D/A) converter 57 converts the baseband digital signal to a baseband analog signal for supply to a television receiver 58, which may alternatively be called a terminal unit.

In the subscriber's terminal shown in FIG. 5, a transmission terminal 61 is for producing an information signal representative of subscriber's information. For example, the transmission terminal 61 is manually controlled to produce a program request signal. Coupled to the frequency control circuit 52, the transmission terminal 61 produces a channel indication signal indicative of the high definition television signal of one of the twenty channels that is selected as a selected channel by the frequency control circuit 52 for use in the terminal unit 58. Furthermore, the transmission terminal 61 may produce a charge signal when the selected channel is a pay channel. At least one of such signals is herein called the information signal.

Turning back to FIG. 4, the pilot signal transmitter 16 is accompanied by a multiplexer 62. Connected to the transmission terminals which are included in the subscriber terminals 46, respectively, and one of which is described with reference to FIG. 5, the multiplexer 62 frequency division multiplexes the information signals into a multiplexed signal. Supplied with the multiplexed signal, the pilot signal transmitter 16 makes the pilot signal beam carry the multiplexed signal according to the frequency shift keying modulation.

In the community antenna television center, the pilot signal receiver 13 produces a baseband signal representative of the multiplexed signal which is carried by the pilot signal beam supplied to the pilot signal receiver 13 through the optical fiber 11 and from the device end of the polarization control unit 21. The monitoring and processing unit 47 serves as a processing unit for processing the baseband signal into a processed signal.

When the program request signals are produced by the subscriber terminals, such as 46, connected to the community antenna television center through the optical fibers, such as 11, the processing unit delivers the processed signal to the television signal generator 35 through a control connection 66 to make the signal generator 35 generate the television signals in accordance with a program requested by the subscribers. When the channel indication signals are produced, the processed signal is delivered to a calculator for calculating a rate at which each of a plurality of television signals is received by the subscribers. When the charge signals are produced, the processed signal is supplied to a charging device for calculating a charge in connection with each subscriber. The calculator and the charging device are installed in the center and are depicted as an output terminal 67 outwardly of the center.

Figure 6:
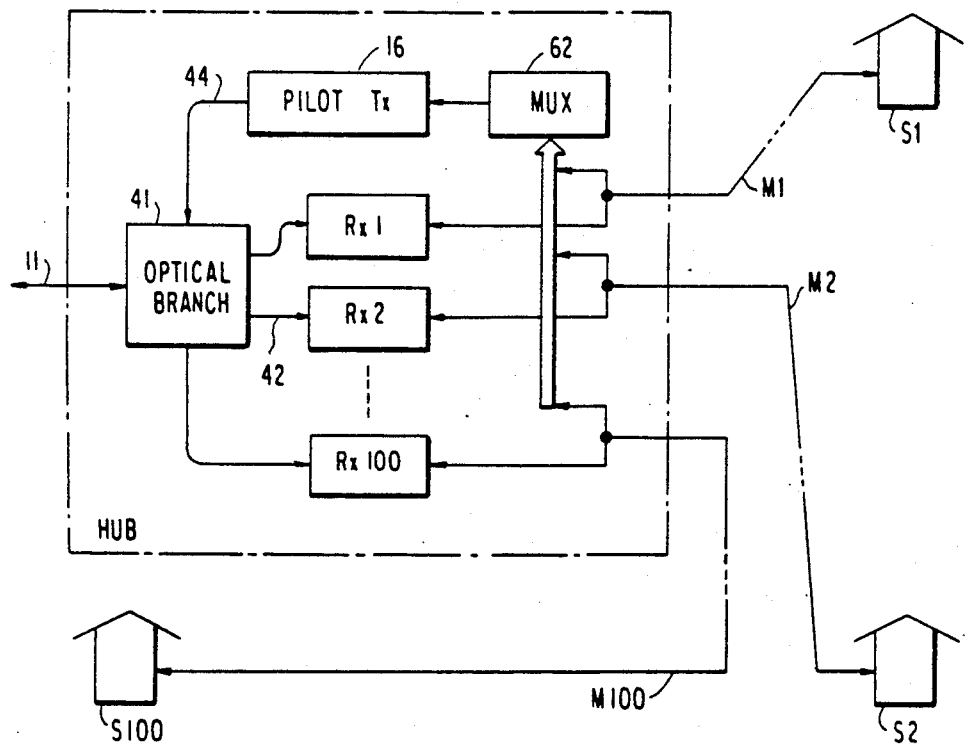
FIG. 6 is a partial block diagram of still another frequency division multiplexed optical signal distributing system which comprises the polarization control system illustrated in FIG. 4.

Referring to FIG. 6, it will be presumed that subscribers are living in first through one hundredth subscriber houses S1 through S100 which are in a few block of a town or a city and that a length of at least one hundred meters is necessary for at least one of the polarization maintaining optical fibers 42. In this event, the tunable receivers Rx1 through Rx100, the pilot signal transmitter 16, and the multiplexer 62 are preferably installed in a hub.

Each of the tunable receivers Rx through Rx100 comprises the local beam source 51, the frequency control circuit 52, the front end 55, the demodulator 56, and the digital-to-analog converter 57 described in conjunction with FIG. 5. The terminal unit 58 and the transmission terminal 61 are installed in each subscriber's house. The baseband analog signals are delivered from the hub to the subscriber houses S1 to S100 through first to one hundredth metal cables M1 to M100. From the transmission terminals of the respective subscriber houses S1 through S100, channel selection signals are sent through the metal cables M1 to M100 to the frequency control circuits of the respective receivers Rx1 to Rx100 to make the frequency control circuits tune the respective receivers Rx1 to Rx100. The information signals are sent also through the metal cables M1 to M100 to the multiplexer 62.

Inasmuch as components are more excellently maintained and administered in the hub than in the apartment-house building, the polarization control and the optical communication systems are given a higher reliability. Inasmuch as long polarization maintaining optical fibers are unnecessary, the polarization control and the optical communication systems are less expensive.

If the most distant one of the subscriber houses S1 through S100 is less than about one hundred meters from the optical branching circuit 41, the tunable receivers Rx1 to Rx100 may be placed in a hub and connected to the subscriber houses S1 to S100 by the polarization maintaining optical fibers 42. This does not much increase the price of the polarization control and the optical communication systems.

While this invention has thus far been described in specific conjunction with a few preferred embodiments thereof, it will now be readily possible for one skilled in the art to carry this invention into effect in various other manners. For example, each of the first and the second signal beams may be a differential phase shift keying (DPSK) modulated or otherwise modulated signal beam. Some of the tunable receivers, such as Rx1 through Rx100, may be used in the buildings with others of the tunable receivers installed in at least one hub for connection through metal cables, such as M1 to M100, to the respective subscriber houses, such as S1 to S100. Incidentally, numerical data are described merely by way of example.

What is claimed is:

1. A polarization control system for use in an optical communication system comprising an optical fiber having first and second ends, first and second transmitter devices for delivering first and second signal beams to said first and said second ends, respectively, and first and second receiver devices for receiving said second and said first signal beams from said first and said second ends, respectively, said first receiver device thereby producing a detected signal, said polarization control system comprising a polarization control unit having a fiber end connected to said first end and a device end connected to said first transmitter device and said first receiver device, and a controller supplied with said detected signal for controlling said polarization control unit so as to make said polarization control unit supply said second signal beam to said first receiver device with a polarization state which is kept substantially constant.

2. A polarization control system as claimed in claim 1, said detected signal having a power level, wherein said controller is for controlling said polarization control unit so as to keep said power level maximum.

3. A polarization control system as claimed in claim 1, said polarization state being a reference polarization state, wherein said first transmitter device is for supplying said first signal beam to said device end with a controlled polarization state which is kept substantially in a predetermined relationship to said reference polarization state.

4. A polarization control system as claimed in claim 3, wherein said controlled polarization state is substantially parallel to said reference polarization state.

5. A polarization control system as claimed in claim 3, wherein said controlled polarization state is substantially orthogonal to said reference polarization state.

6. A polarization control system as claimed in claim 3, wherein each of said first and said second signal beams is a single signal beam.

7. A polarization control system as claimed in claim 6, wherein said first and said second signal beams have a substantially common frequency.

8. A polarization control system as claimed in claim 3, wherein each of said first and said second signal beams is a frequency division multiplexed signal beam.

9. A polarization control system as claimed in claim 8, wherein said first and said second signal beams have a substantially common frequency band.

10. A polarization control system as claimed in claim 8, said first receiver device comprising a plurality of receivers, each receiver being for receiving said second signal beam from said device end, wherein said detected signal is produced by a predetermined one of said receivers.

11. A polarization control system as claimed in claim 3, wherein said first signal beam is a frequency division multiplexed signal beam, said second signal beam being a pilot signal beam.

12. A polarization control system as claimed in claim 11, said first signal beam having a predetermined frequency band, wherein said second signal beam has a frequency which is substantially equal to a center of said frequency band.

13. A polarization control system as claimed in claim 11, wherein said first receiver device comprises an optical detector unit for detecting the second signal beam supplied from said device end to produce a detector output having an output level, and a monitoring unit for monitoring said output level to monitor at least one of said polarization control and said optical communication systems.

14. A polarization control system as claimed in claim 11, said first transmitter device being a combination of a transmitter unit and one of a plurality of output terminals of said transmitter unit, said transmitter unit being for making each of said output ports produce said first signal beam, wherein said second receiver device is in correspondence to said one of the output ports and comprises a plurality of tunable receivers, each tunable receiver being for tunably receiving said first signal beam from said second end.

15. A polarization control system as claimed in claim 14, each of said tunable receivers being for producing an information signal representative of subscriber's information, wherein said polarization control system further comprises a multiplexer for multiplexing the information signals of said tunable receivers into a multiplexed signal, said second transmitter device being supplied with said multiplexed signal to make said second signal beam carry said multiplexed signal, said polarization control system still further comprising a processing unit for processing into a processed signal a baseband signal which is supplied from said first receiver device and represents the multiplexed signal carried by the second signal beam supplied to said first receiver device from the device end of said polarization control unit.

16. A polarization control system for use in a frequency division multiplexed optical signal distributing system comprising an optical fiber having first and second ends, a transmitter unit having a plurality of output ports, and a plurality of receiver devices in correspondence to said output ports, said transmitter unit being for making each of said output ports produce a frequency division multiplexed signal beam, each of said receiver devices comprising a plurality of tunable receivers, said first end being supplied with said frequency division multiplexed signal beam from one of said output ports, said second end being for making the receivers of a corresponding one of said receiver devices tunably receive said frequency division multiplexed signal beam, said polarization control system comprising a pilot signal transmitter for delivering a pilot signal beam to said second end, a polarization control unit having a fiber end connected to said first end and a device end connected to said one of the output ports, a pilot signal receiver connected to said device end for detecting the pilot signal beam transmitted through said optical fiber and said polarization control unit to produce a detected signal, and a controller supplied with said detected signal for controlling said polarization control unit so as to make said polarization control unit supply said pilot signal beam to said pilot signal receiver with a polarization state which is kept substantially constant.

17. A polarization control system as claimed in claim 16, said polarization state being a reference polarization state, wherein said one of the output ports is for producing said frequency division multiplexed signal beam with a controlled polarization state which is kept substantially in a predetermined relationship to said reference polarization state.

18. A polarization control system as claimed in claim 17, each of the tunable receivers of said corresponding one of the receiver devices being in a subscriber's house and comprising an optical detector unit for detecting said frequency division multiplexed signal beam to produce a baseband signal, and a terminal unit for utilizing said baseband signal.

19. A polarization control system as claimed in claim 17, the tunable receivers of said corresponding one of the receiver devices comprising optical detector units in a hub for detecting said frequency division multiplexed signal beam to produce baseband signals, respectively, a terminal unit in a subscriber's house, and a metal cable between each of said optical detector units and said terminal unit for making said terminal unit utilize one of said baseband signals that is produced by said each of the optical detector units.

* * * * *

UNITED STATES PATENT AND TRADEMARK OFFICE
CERTIFICATE OF CORRECTION

PATENT NO. : 5,013,116
DATED : May 7, 1991
INVENTOR(S) : Shuntaro YAMAZAKI et al It is certified that error appears in the above-identified patent and that said Letters Patent is hereby corrected as shown below:

Column 7, line 6, delete "systes", and insert --systems--

Signed and Sealed this

Fifteenth Day of September, 1992

Attest:

DOUGLAS B. COMER

*Attesting Officer*            *Acting Commissioner of Patents and Trademarks*